United States Patent
Kono et al.

(10) Patent No.: US 10,781,344 B2
(45) Date of Patent: Sep. 22, 2020

(54) TACKIFIER RESIN AND PRESSURE-SENSITIVE ADHESIVE COMPOSITION

(71) Applicant: Harima Chemicals, Incorporated, Kakogawa-shi, Hyogo (JP)

(72) Inventors: Masakazu Kono, Hyogo (JP); Hiroki Abe, Hyogo (JP); Tomoya Tanatsugu, Hyogo (JP); Keiji Sasakura, Hyogo (JP)

(73) Assignee: HARIMA CHEMICALS, INCORPORATED, Kakogawa-shi, Hyogo (JP)

( * ) Notice: Subject to any disclaimer, the term of this patent is extended or adjusted under 35 U.S.C. 154(b) by 66 days.

(21) Appl. No.: 15/779,671

(22) PCT Filed: Oct. 17, 2016

(86) PCT No.: PCT/JP2016/080727
§ 371 (c)(1),
(2) Date: May 29, 2018

(87) PCT Pub. No.: WO2017/094372
PCT Pub. Date: Jun. 8, 2017

(65) Prior Publication Data
US 2018/0371297 A1  Dec. 27, 2018

(30) Foreign Application Priority Data
Nov. 30, 2015  (JP) .................. 2015-233224

(51) Int. Cl.
| | |
|---|---|
| *C09J 11/08* | (2006.01) |
| *C09J 201/00* | (2006.01) |
| *C09J 11/06* | (2006.01) |
| *C09J 133/00* | (2006.01) |
| *C09J 193/04* | (2006.01) |
| *C09F 1/04* | (2006.01) |
| *C09J 133/10* | (2006.01) |

(52) U.S. Cl.
CPC .............. *C09J 11/08* (2013.01); *C09F 1/04* (2013.01); *C09J 11/06* (2013.01); *C09J 133/00* (2013.01); *C09J 133/10* (2013.01); *C09J 193/04* (2013.01); *C09J 201/00* (2013.01)

(58) Field of Classification Search
CPC .. C09F 1/04; C09J 11/06; C09J 133/00; C09J 193/04; C09J 133/10; C09J 11/08; C09J 201/00

USPC ........................................................ 524/272
See application file for complete search history.

(56) References Cited

U.S. PATENT DOCUMENTS

| | | |
|---|---|---|
| 2,555,042 A | 5/1951 | Krumbhaar |
| 4,643,848 A | 2/1987 | Thomas et al. |
| 5,120,781 A | 6/1992 | Johnson, Jr. |
| 5,246,998 A | 9/1993 | Wideman et al. |
| 6,022,947 A | 2/2000 | Frihart et al. |
| 6,562,888 B1 | 5/2003 | Frihart et al. |
| 2001/0021737 A1 | 9/2001 | Hazen et al. |
| 2004/0214987 A1 | 10/2004 | Gaudl |
| 2013/0005911 A1 | 1/2013 | Okamoto et al. |

FOREIGN PATENT DOCUMENTS

| | | |
|---|---|---|
| CN | 1069994 A | 3/1993 |
| CN | 1400994 A | 3/2003 |
| JP | 07-197396 A | 8/1995 |
| JP | 07-278498 A | 10/1995 |
| JP | 08-109332 A | 4/1996 |
| JP | 09-025472 A | 1/1997 |
| JP | 2002-524576 A | 8/2002 |
| JP | 2002-526592 A | 8/2002 |
| JP | 2002-322450 A | 11/2002 |
| JP | 2002322450 A * | 11/2002 |
| JP | 2005-239875 A | 9/2005 |
| JP | 2006-169293 A | 6/2006 |
| JP | 2008-231275 A | 10/2008 |
| JP | 2010-106259 A | 5/2010 |
| JP | 2011-202012 A | 10/2011 |

OTHER PUBLICATIONS

English Machine Translation of JP 2002-322450 (Year: 2002).*
PCT International Preliminary Report on Patentability (IPRP) and Written Opinion dated Jun. 14, 2018, in corresponding International Application No. PCT/JP2016/080727 (23 pages).
Extended Search Report issued by the European Patent Office in corresponding European Patent Application No. 16870312.2-1102 dated Jul. 2, 2019 (7 pages).
International Search Report (PCT/ISA/210) dated Nov. 15, 2016, by the Japanese Patent Office as the International Searching Authority for International Application No. PCT/JP2016/080727.
Written Opinion (PCT/ISA/237) dated Nov. 15, 2016, by the Japanese Patent Office as the International Searching Authority for International Application No. PCT/JP2016/080727.

* cited by examiner

*Primary Examiner* — Angela C Scott
(74) *Attorney, Agent, or Firm* — Buchanan Ingersoll & Rooney PC

(57) ABSTRACT

A tackifier resin is a reaction product of rosins (A), a ring structure-containing compound (B) capable of reacting with the rosins, and an alcohol (C).

5 Claims, No Drawings

TACKIFIER RESIN AND PRESSURE-SENSITIVE ADHESIVE COMPOSITION

TECHNICAL FIELD

The present invention relates to a tackifier resin and a pressure-sensitive adhesive composition, to be specific, to a tackifier resin for improving pressure-sensitive adhesive properties by being mixed with a pressure-sensitive adhesive resin, and a pressure-sensitive adhesive composition containing the tackifier resin.

BACKGROUND ART

Conventionally, it has been known that an additive such as a tackifier is added to a pressure-sensitive adhesive so as to improve the pressure-sensitive adhesive properties.

To be specific, as the tackifier, for example, a tackifier resin emulsion has been proposed which is obtained by emulsifying a polymerized rosin ester resin having a weight average molecular weight of 2000 to 3500, a hydroxyl value of 35 to 100 mgKOH/g, and the content of a component having a weight average molecular weight of 260 or less of 1.5 weight % or less (ref: the following Patent Document 1).

CITATION LIST

Patent Document

Patent Document 1: Japanese Unexamined Patent Publication No. 2010-106259

SUMMARY OF THE INVENTION

Problem to be Solved by the Invention

There is a disadvantage that when the tackifier resin emulsion described in the above-described Patent Document 1 is mixed with the pressure-sensitive adhesive, the pressure-sensitive adhesive force and the adhesiveness to a curved surface (curved surface adhesiveness) of the pressure-sensitive adhesive are not sufficient.

An object of the present invention is to provide a tackifier resin capable of improving the pressure-sensitive adhesive force and the curved surface adhesiveness, and a pressure-sensitive adhesive composition containing the tackifier resin.

Means for Solving the Problem

The present invention [1] includes a tackifier resin being a reaction product of rosins (A), a ring structure-containing compound (B) capable of reacting with the rosins, and an alcohol (C).

The present invention [2] includes the tackifier resin described in the above-described [1], wherein the ring structure-containing compound (B) contains a compound having an alicyclic group containing two or more alicyclic rings and/or a compound having an aromatic group containing one or more aromatic rings.

The present invention [3] includes the tackifier resin described in the above-described [1] or [2], wherein the ring structure-containing compound (B) contains a compound having an isobornyl group.

The present invention [4] includes the tackifier resin described in the above-described [1] or [2], wherein the ring structure-containing compound (B) contains a compound having a benzyl group.

The present invention [5] includes the tackifier resin described in any one of the above-described [1] to [4], wherein the rosins (A) are a non-modified rosin, and the ring structure-containing compound (B) is a (meth)acrylate having a ring structure.

The present invention [6] includes the tackifier resin described in any one of the above-described [1] to [4], wherein the rosins (A) are an acid-modified rosin, and the ring structure-containing compound (B) is an alcohol having a ring structure.

The present invention [7] includes a pressure-sensitive adhesive composition containing the tackifier resin described in any one of the above-described [1] to [6], and a (meth)acrylic resin.

Effect of the Invention

A tackifier resin of the present invention is a reaction product of the above-described specific component, so that excellent pressure-sensitive adhesive force and excellent curved surface adhesiveness can be imparted to the pressure-sensitive adhesive composition.

A pressure-sensitive adhesive composition of the present invention contains the tackifier resin of the present invention, so that it has excellent pressure-sensitive adhesive force and excellent curved surface adhesiveness.

DESCRIPTION OF EMBODIMENTS

A tackifier resin of the present invention is a reaction product of rosins (A), a ring structure-containing compound (B) capable of reacting with the rosins (A), and an alcohol (C).

The rosins (A) are not particularly limited as long as they contain a resin acid having a reactive double bond. Examples thereof include non-modified rosins (unmodified rosins) and rosin modified products (derivatives). The resin acid is a compound having a carboxyl group derived from trees, and examples of the resin acid having a reactive double bond include abietic acid, palustric acid, neoabietic acid, and levopimaric acid.

Examples of the non-modified rosin include tall oil rosin, gum rosin, and wood rosin. These non-modified rosins can be used alone or in combination of two or more. As the non-modified rosin, preferably, a gum rosin is used.

The rosin modified product is a modified product of the above-described non-modified rosin, and examples thereof include acid-modified rosin, disproportionated rosin, hydrogenated rosin, and polymerized rosin.

These rosin modified products can be used alone or in combination of two or more.

The rosin modified product may contain the resin acid having a reactive double bond, and there may be a case where the disproportionated rosin has the low content of the resin acid having a reactive double bond depending on the disproportionation rate, and the hydrogenated rosin has the low content of the resin acid having a reactive double bond depending on the hydrogenation rate. The polymerized rosin has the low content of the resin acid having a reactive double bond depending on the polymerization degree, and furthermore, the reactivity thereof may be lowered because of steric hindrance.

As the rosin modified product, preferably, an acid-modified rosin, a disproportionated rosin, and a hydrogenated rosin are used, more preferably, an acid-modified rosin is used.

The acid-modified rosin is a modified product of the above-described non-modified rosin by α,β-unsaturated carboxylic acids. To be specific, the acid-modified rosin can be obtained by, for example, reacting the α,β-unsaturated carboxylic acids with the above-described non-modified rosin by a known method.

Examples of the α,β-unsaturated carboxylic acids include α,β-unsaturated carboxylic acid and acid anhydride thereof. To be specific, examples thereof include fumaric acid, maleic acid, maleic anhydride, itaconic acid, citraconic acid, citraconic anhydride, acrylic acid, and methacrylic acid.

These α,β-unsaturated carboxylic acids can be used alone or in combination of two or more.

As the α,β-unsaturated carboxylic acids, preferably, a maleic acid and a maleic anhydride are used.

As the mixing ratio of the non-modified rosin to the α,β-unsaturated carboxylic acids, the ratio of the α,β-unsaturated carboxylic acids with respect to 1 mol of the non-modified rosin is, for example, 1 mol or less. In the reaction of the non-modified rosin with the α,β-unsaturated carboxylic acids, the reaction temperature is, for example, 150 to 300° C., and the reaction time is, for example, 1 to 24 hours. In the reaction, a known catalyst can be also added at an appropriate proportion as needed.

The acid value of the acid-modified rosin is, for example, 100 mgKOH/g or more, preferably 150 mgKOH/g or more, and for example, 500 mgKOH/g or less, preferably 400 mgKOH/g or less.

These rosins (A) can be used alone or in combination of two or more.

As the rosins (A), in view of low cost and environmental friendliness, preferably, rosins excluding the polymerized rosin are used. To be specific, there may be a case where the production of the polymerized rosin is expensive, and in the production process thereof, a strong acid such as sulfuric acid and Lewis acid is used, so that its environmental friendliness is poor and the reactivity thereof is insufficient. Thus, as the rosins, preferably, the rosins excluding the polymerized rosin are used.

To be more specific, as the rosins (A), preferably, a non-modified rosin, an acid-modified rosin, a disproportionated rosin, and a hydrogenated rosin are used, and in view of reactivity, more preferably, a non-modified rosin and an acid-modified rosin are used.

The ring structure-containing compound (B) is a compound in which one or more ring structures are included in its molecule.

Examples of the ring structure include an alicyclic ring and an aromatic ring. In other words, an example of the ring structure-containing compound includes a compound having an alicyclic group and/or an aromatic group.

Examples of the alicyclic group include an alicyclic group containing one alicyclic ring and an alicyclic group containing two or more alicyclic rings.

The alicyclic group containing one alicyclic ring may contain a hetero atom, and examples thereof include cyclopropyl group, cyclobutyl group, cyclopentyl group, cyclohexyl group, cycloheptyl group, cyclooctyl group, methylcyclohexyl group, ethylcyclohexyl group, n-butylcyclohexyl group, t-butylcyclohexyl group, dimethylcyclohexyl group, cyclohexenyl group, tetrahydrofurfuryl group, and cyclic trimethylolpropaneformal group.

The alicyclic group containing two or more alicyclic rings is a group in which a ring structure such as cross-linking ring, condensation ring, and spiro ring is formed by two or more rings, and may contain a hetero atom. Examples thereof include bornyl group, norbornyl group, isobornyl group, adamantyl group, adamantylmethyl group, 2-methyladamantyl group, dimethyladamantyl group, bicyclo[4.4.0]decanyl group, dicyclopentanyl group, dicyclopentenyl group, tricyclopentanyl group, tricyclopentenyl group, tricyclodecanyl group, dicyclopentanyloxyethyl group, 2-[(2,4-cyclopentadienyl)oxy]ethyl group, (2-methyl-2-ethyl-1,3-dioxolane-4-yl)methyl group, and (3-ethyloxetane-3-yl)methyl group. Preferably, a bornyl group, a norbornyl group, and an isobornyl group are used.

The aromatic group may form a ring structure such as condensation ring by two or more rings, and may contain a hetero atom. Examples of the aromatic group include phenyl group, tolyl group, t-butylphenyl group, benzyl group, styryl group, naphthyl group, anthracyl group, phenoxyethyl group, and 2-hydroxy-3-phenoxypropyl group. Preferably, benzyl group is used.

As the ring structure-containing compound, in view of improvement of the pressure-sensitive adhesive force and the curved surface adhesiveness, preferably, a compound having an alicyclic group containing two or more alicyclic rings and a compound having an aromatic group are used.

To be more specific, in view of improvement of the curved surface adhesiveness, preferably, a compound having an alicyclic group containing two or more alicyclic rings is used, particularly preferably, a compound having a bornyl group, a norbornyl group, and an isobornyl group is used.

In view of improvement of the pressure-sensitive adhesive force, preferably, a compound having an aromatic group is used, particularly preferably, a compound having a benzyl group is used.

As the ring structure-containing compound (B), a compound capable of reacting with the rosins (A) is appropriately selected in accordance with the type of the rosins (A).

To be more specific, for example, when the rosins (A) are a non-modified rosin, the ring structure-containing compound (B) is selected from the compound capable of reacting with the non-modified rosin. An example thereof includes (meth)acrylate having a ring structure.

That is, in this case, the rosins (A) are the non-modified rosin, and the ring structure-containing compound (B) is the (meth)acrylate having a ring structure. This combination can achieve improvement of the curved surface adhesiveness.

The (meth)acrylate is defined as acrylate and/or methacrylate. Also, "(meth)acrylic" is defined as "acrylic" and/or "methacrylic" in the same manner as that described above.

Examples of the (meth)acrylate having a ring structure include (meth)acrylate having an alicyclic group and (meth)acrylate having an aromatic group.

Examples of the (meth)acrylate having an alicyclic group include (meth)acrylate having an alicyclic group containing one alicyclic ring and (meth)acrylate having an alicyclic group containing two or more alicyclic rings.

Examples of the (meth)acrylate having an alicyclic group containing one alicyclic ring include cyclopropyl (meth)acrylate, cyclobutyl (meth)acrylate, cyclopentyl (meth)acrylate, cyclohexyl (meth)acrylate, cycloheptyl (meth)acyrylate, cyclooctyl (meth)acrylate, methylcyclohexyl (meth)acrylate, ethylcyclohexyl (meth)acrylate, n-butylcyclohexyl (meth)acrylate, t-butylcyclohexyl (meth)acrylate, dimethylcyclohexyl (meth)acrylate, cyclohexenyl (meth)acrylate, tetrahydrofurfuryl (meth)acrylate, and cyclic trimethylolpropane formal (meth)acrylate. These (meth)acrylates having an alicyclic group containing one alicyclic ring can be used alone or in combination of two or more. As the (meth)acrylate having an alicyclic group containing one alicyclic ring, preferably, a cyclohexyl (meth)acrylate is used.

Examples of the (meth)acrylate having an alicyclic group containing two or more alicyclic rings include bornyl (meth)acrylate, norbornyl (meth)acrylate, isobornyl (meth)acrylate, adamantyl (meth)acrylate, adamantylmethyl (meth)acrylate, 2-methyladamantyl (meth)acrylate, dimethyladamantyl (meth)acrylate, bicyclo[4.4.0]decanyl (meth)acrylate, dicyclopentanyl (meth)acrylate, dicyclopentenyl (meth)acrylate, tricyclopentanyl (meth)acrylate, tricyclopentenyl (meth)acrylate, tricyclodecanyl (meth)acrylate, dicyclopentanyloxyethyl (meth)acrylate, 2-[(2,4-cyclopentadienyl)oxy]ethyl (meth)acrylate, (2-methyl-2-ethyl-1,3-dioxolane-4-yl)methyl (meth)acrylate, and (3-ethyloxetane-3-yl)methyl (meth)acrylate. These (meth)acrylates having an alicyclic group containing two or more alicyclic rings can be used alone or in combination of two or more. As the (meth)acrylate having an alicyclic group containing two or more alicyclic rings, preferably, bornyl (meth)acrylate, norbornyl (meth)acrylate, and isobornyl (meth)acrylate are used, more preferably, isobornyl (meth)acrylate is used.

These (meth)acrylates having an alicyclic group can be used alone or in combination of two or more.

As the (meth)acrylate having an alicyclic group, preferably, (meth)acrylate having an alicyclic group containing two or more alicyclic rings is used.

Examples of the (meth)acrylate having an aromatic group include phenyl (meth)acrylate, benzyl (meth)acrylate, phenoxyethyl (meth)acrylate, phenoxy polyethylene glycol (meth)acrylate, nonylphenoxy polyethylene glycol (meth)acrylate, phenoxy polypropylene glycol (meth)acrylate, biphenyl (meth)acrylate, and ethoxylated ortho-phenylphenol (meth)acrylate.

These (meth)acrylates having an aromatic group can be used alone or in combination of two or more.

As the (meth)acrylate having an aromatic group, preferably, a benzyl (meth)acrylate is used.

When the rosins (A) are the non-modified rosin, as the ring structure-containing compound (B), in view of improvement of the curved surface adhesiveness, preferably, a (meth)acrylate having an alicyclic group containing two or more alicyclic rings is used, particularly preferably, an isobornyl (meth)acrylate is used. In view of improvement of the pressure-sensitive adhesive force, preferably, a (meth)acrylate having an aromatic group is used, particularly preferably, a benzyl (meth)acrylate is used.

When the rosins (A) are the acid-modified rosin, the ring structure-containing compound (B) is selected from a compound capable of reacting with the acid-modified rosin. An example of the compound includes an alcohol having a ring structure.

Examples of the alcohol having a ring structure include alcohol having an alicyclic group and alcohol having an aromatic group.

Examples of the alcohol having an alicyclic group include alcohol having an alicyclic group containing one alicyclic ring and alcohol having an alicyclic group containing two or more alicyclic rings.

Examples of the alcohol having an alicyclic group containing one alicyclic ring include cyclopropyl alcohol, cyclobutyl alcohol, cyclopentyl alcohol, cyclohexyl alcohol, cycloheptyl alcohol, cyclooctyl alcohol, methylcyclohexyl alcohol, ethylcyclohexyl alcohol, n-butylcyclohexyl alcohol, t-butylcyclohexyl alcohol, dimethylcyclohexyl alcohol, cyclohexenyl alcohol, tetrahydrofurfuryl alcohol, and cyclic trimethylolpropaneformal alcohol. These alcohols having an alicyclic group containing one alicyclic ring can be used alone or in combination of two or more. As the alcohol having an alicyclic group containing one alicyclic ring, preferably, a cyclohexyl alcohol is used.

Examples of the alcohol having an alicyclic group containing two or more alicyclic rings include bornyl alcohol (also known as borneol), norbornyl alcohol (also known as norborneol), isobornyl alcohol (also known as isoborneol), adamantyl alcohol, adamantylmethyl alcohol, 2-methyladamantyl alcohol, dimethyladamantyl alcohol, bicyclo[4.4.0]decanyl alcohol, dicyclopentanyl alcohol, dicyclopentenyl alcohol, tricyclopentanyl alcohol, tricyclopentenyl alcohol, tricyclodecanyl alcohol, dicyclopentanyloxyethyl alcohol, 2-[(2,4-cyclopentadienyl)oxy]ethyl alcohol, (2-methyl-2-ethyl-1,3-dioxolane-4-yl)methyl alcohol, and (3-ethyloxetane-3-yl)methyl alcohol. These alcohols having an alicyclic group containing two or more alicyclic rings can be used alone or in combination of two or more. As the alcohol having an alicyclic group containing two or more alicyclic rings, preferably, a bornyl alcohol (also known as borneol), a norbornyl alcohol (also known as norborneol), and an isobornyl alcohol (also known as isoborneol) are used.

These alcohols having an alicyclic group can be used alone or in combination of two or more.

As the alcohol having an alicyclic group, preferably, an alcohol having an alicyclic group containing two or more alicyclic rings is used.

Examples of the alcohol having an aromatic group include phenyl alcohol, benzyl alcohol, phenoxyethyl alcohol, phenoxy polyethylene glycol alcohol, nonylphenoxy polyethylene glycol alcohol, phenoxy polypropylene glycol alcohol, biphenyl alcohol, and ethoxylated ortho-phenylphenol alcohol.

These alcohols having an aromatic group can be used alone or in combination of two or more.

As the alcohol having an aromatic group, preferably, a benzyl alcohol is used.

When the rosins (A) are the acid-modified rosin, as the ring structure-containing compound (B), in view of improvement of the curved surface adhesiveness, preferably, an alcohol having an alicyclic group containing two or more alicyclic rings is used, particularly preferably, an isobornyl alcohol is used. In view of improvement of the pressure-sensitive adhesive force, preferably, an alcohol having an aromatic group is used, particularly preferably, a benzyl alcohol is used.

These ring structure-containing compounds (B) can be used alone or in combination of two or more.

As the ring structure-containing compound (B), in view of pressure-sensitive adhesive force, preferably, a (meth)acrylate having an aromatic group, a (meth)acrylate having an alicyclic group, and an alcohol having an aromatic group are used, more preferably, a (meth)acrylate having an aromatic group and an alcohol having an aromatic group are used, further more preferably, a (meth)acrylate having an aromatic group is used.

As the ring structure-containing compound (B), in view of curved surface adhesiveness, preferably, a (meth)acrylate having an aromatic group, a (meth)acrylate having an alicyclic group, and an alcohol having an alicyclic group are used, more preferably, a (meth)acrylate having an aromatic group and a (meth)acrylate having an alicyclic group are used, further more preferably, a (meth)acrylate having an alicyclic group is used.

In this case, the rosins (A) are selected in accordance with the ring structure-containing compound (B).

The alcohol (C) is not particularly limited as long as it is a compound having one or more hydroxyl groups, and preferably, an alcohol without having a ring structure is used, more preferably, an aliphatic alcohol is used. To be more specific, examples thereof include monohydric aliphatic alcohols such as methanol, ethanol, and propanol; dihydric aliphatic alcohols such as ethylene glycol, diethylene glycol, propylene glycol, and neopentyl glycol; trihydric aliphatic alcohols such as glycerin, trimethylolethane, and trimethylolpropane; tetrahydric aliphatic alcohols such as pentaerythritol and diglycerine; and hexahydric aliphatic alcohols such as dipentaerythritol.

These alcohols (C) can be used alone or in combination of two or more.

As the alcohol (C), preferably, a dihydric or more aliphatic alcohol is used, more preferably, a tetrahydric aliphatic alcohol is used, further more preferably, pentaerythritol is used.

To allow the rosins (A), the ring structure-containing compound (B), and the alcohol (C) to react with each other, for example, the rosins (A), the ring structure-containing compound (B), and the alcohol (C) can collectively react, and preferably, the rosins (A), the ring structure-containing compound (B), and the alcohol (C) sequentially react.

To be more specific, in this method, first, the rosins (A) react with the ring structure-containing compound (B).

In the reaction of the rosins (A) with the ring structure-containing compound (B), the mass ratio of the ring structure-containing compound (B) is lower than that of the rosins (A), and to be specific, the ratio of the ring structure-containing compound (B) with respect to 100 parts by mass of the rosins (A) is, for example, 0.1 parts by mass or more, preferably 0.5 parts by mass or more, more preferably 1 part by mass or more, and for example, 50 parts by mass or less, preferably 20 parts by mass or less, more preferably 10 parts by mass or less.

In this step, a different reaction is caused in accordance with the type of the rosins (A) and the type of the ring structure-containing compound (B).

To be specific, for example, when the ring structure-containing compound (B) is the (meth)acrylate having a ring structure, the rosins (A) (preferably, non-modified rosin) and the ring structure-containing compound (B) are subjected to diels-alder reaction.

As the reaction conditions in this case, the reaction temperature is, for example, 150° C. or more, preferably 200° C. or more, and for example, 250° C. or less, preferably 220° C. or less under an inert gas atmosphere and an atmospheric pressure. The reaction time is, for example, 0.5 hours or more, preferably 2 hours or more, and for example, 8 hours or less, preferably 6 hours or less.

In this case, when a polymerization initiator such as peroxide and azo compound is added along with the rosins (A) and the ring structure-containing compound (B), promotion of the diels-alder reaction may be inhibited. Thus, preferably, a reaction material does not include the polymerization initiator.

When the ring structure-containing compound (B) is the alcohol having a ring structure, the rosins (A) (preferably, acid-modified rosin) and the ring structure-containing compound (B) are subjected to esterification reaction.

As the reaction conditions in this case, the reaction temperature is, for example, 150° C. or more, preferably 190° C. or more, and for example, 250° C. or less, preferably 210° C. or less under an inert gas atmosphere and an atmospheric pressure. The reaction time is, for example, 0.5 hours or more, preferably 2 hours or more, and for example, 10 hours or less, preferably 8 hours or less.

In this manner, a reaction product of the rosins (A) and the ring structure-containing compound (B) is obtained. To be specific, a ring structure-added rosin in which the ring structure-containing compound (B) is added to the rosins (A) is obtained.

Next, in this method, the reaction product obtained by the above-described method (ring structure-added rosin) reacts with the alcohol (C) (esterification reaction).

The mixing amount of the alcohol (C) is not particularly limited, and appropriately set so that the acid value of a tackifier resin to be obtained is within a range to be described later.

To be specific, the ratio of a hydroxyl group of the alcohol (C) with respect to a carboxyl group of the reaction product of the rosins (A) and the ring structure-containing compound (B), on the equivalent basis, is for example, 1 time or more, preferably 1.1 times or more, and for example, twice or less, preferably 1.8 times or less.

To be more specific, the ratio of the alcohol (C) with respect to 100 parts by mass of the reaction product of the rosins (A) and the ring structure-containing compound (B) is, for example, 7 parts by mass or more, preferably 9 parts by mass or more, more preferably 11 parts by mass or more, and for example, 20 parts by mass or less, preferably 18 parts by mass or less, more preferably 16 parts by mass or less.

In this manner, a tackifier resin is obtained as a reaction product of the rosins (A), the ring structure-containing compound (B), and the alcohol (C).

When the rosins (A), the ring structure-containing compound (B), and the alcohol (C) sequentially react, the order of the reaction is not limited to the description above, and for example, first, rosins (A) react with the alcohol (C) and thereafter, the obtained reaction product may react with the ring structure-containing compound (B).

In view of production efficiency, preferably, first, the rosins (A) react with the ring structure-containing compound (B) and thereafter, the obtained reaction product reacts with the alcohol (C). In this manner, the tackifier resin can be efficiently obtained.

The weight average molecular weight (GPC measurement with standard polystyrene calibration) of the obtained tackifier resin is, for example, 500 or more, preferably 800 or more, and for example, 2500 or less, preferably 2000 or less.

The acid value of the tackifier resin is, for example, 5 mgKOH/g or more, preferably 10 mgKOH/g or more, and for example, 20 mgKOH/g or less.

The measurement method of the acid value is in conformity with Examples to be described later.

The tackifier resin thus obtained is a reaction product of the above-described specific components, so that excellent pressure-sensitive adhesive force and excellent curved surface adhesiveness can be imparted to a pressure-sensitive adhesive composition.

The tackifier resin is prepared as a tackifier resin emulsion as needed.

The tackifier resin emulsion is, for example, obtained by water-dispersing the tackifier resin by using an emulsifier.

The emulsifier is not particularly limited, and examples thereof include anionic emulsifier, nonionic emulsifier, and cationic emulsifier. These can be used alone or in combination of two or more.

As the emulsifier, preferably, an anionic emulsifier and a nonionic emulsifier are used.

Examples of the anionic emulsifier include organic sulfonic acid, alkali metal salt of sulfuric ester, and ammonium salt. To be more specific, examples thereof include alkyl aryl sulfonates such as sodium dodecylbenzenesulfonate; alkyl (or alkenyl) sulfate ester salts such as sodium lauryl sulfate and sodium oleyl sulfate; polyoxyethylene alkyl (or alkenyl) ether sulfate ester salts such as sodium polyoxyethylene lauryl ether sulfate and sodium polyoxyethylene oleyl ether sulfate; polyoxyethylene alkylaryl ether sulfate ester salts such as sodium polyoxyethylene nonylphenyl ether sulfate and sodium polyoxyethylene styrylphenyl ether sulfate; alkylsulfosuccinic acid salts such as sodium monooctyl sulfosuccinate, sodium dioctyl sulfosuccinate, and disodium polyoxyethylene lauryl sulfosuccinate and derivatives thereof; and alkyl diaryl ether disulfonates such as sodium alkyl diphenyl ether disulfonate and derivatives thereof. These can be used alone or in combination of two or more.

Examples of the nonionic emulsifier include polyoxyethylene alkyl (or alkenyl) ethers such as polyoxyethylene lauryl ether and polyoxyethylene oleyl ether; polyoxyethylene alkyl phenyl ethers such as polyoxyethylene nonyl phenyl ether and polyoxyethylene styryl phenyl ether; sorbitan higher fatty acid esters such as sorbitan monolaurate and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylene monooleate; glycerin higher fatty acid esters such as monoglyceride oleate and monoglyceride stearate; and polyoxyethylene-polyoxypropylene-block copolymer. These can be used alone or in combination of two or more.

An example of the emulsifier includes a synthetic polymer emulsifier. The synthetic polymer emulsifier is obtained as an aqueous dispersion polymer by polymerizing a polymerizable monomer (for example, styrene, α-methylstyrene, vinyltoluene, (meth)acrylic acid, maleic acid, (meth)acrylates, acrylamide, vinyl acetate, styrene sulfonic acid, isoprene sulfonic acid, vinyl sulfonic acid, allyl sulfonic acid, and 2-(meth)acrylamide-2-methylpropane sulfonic acid and furthermore, another monomer copolymerizable with these) by a known method; next, forming salt by adding alkalis (for example, sodium hydroxide, potassium hydroxide, and ammonia) to the obtained polymer; and thereafter, dispersing the obtained salt in water.

These emulsifiers can be used alone or in combination of two or more.

The mixing ratio of the emulsifier is not particularly limited, and the ratio thereof with respect to 100 parts by mass of the tackifier resin is, for example, 1 part by mass or more, preferably 2 parts by mass or more, and for example, 10 parts by mass or less, preferably 5 parts by mass or less.

As a method for obtaining the tackifier resin emulsion by using the emulsifier, for example, a known emulsification method such as solvent emulsification method and solventless emulsification method is used.

In the solvent emulsification method, first, the above-described tackifier resin is dissolved in an organic solvent, thereby obtaining a tackifier resin solution. The organic solvent is not particularly limited as long as it is a solvent capable of dissolving the tackifier resin, and examples thereof include chlorinated hydrocarbon solvents such as methylene chloride; aromatic hydrocarbon solvents such as toluene and xylene; and ketone solvents such as methyl ketone and methyl isobutyl ketone. These can be used alone or in combination of two or more. The mixing ratio of the organic solvent to the tackifier resin is not particularly limited, and appropriately set in accordance with its purpose and use.

In this method, the obtained tackifier resin solution, and emulsion water obtained by mixing and dissolving the above-described emulsifier and water are mixed to prepare an aqueous emulsion of coarse particles. Thereafter, after the obtained aqueous emulsion is finely emulsified by using a known emulsifying disperser (for example, various mixers, a colloid mill, a high-pressure emulsifying apparatus, a high-pressure discharge emulsifying apparatus, and a high shear-type emulsifying disperser), an organic solvent is removed, while being heated under a normal pressure or a reduced pressure. In this manner, a tackifier resin emulsion is obtained.

In the solventless emulsification method, first, the tackifier resin that is heated and melted under a normal pressure or under a pressure is mixed with the above-described emulsification solution, thereby preparing an aqueous emulsion of coarse particles. Thereafter, the obtained aqueous emulsion is finely emulsified by using the above-described emulsifying disperser. In this manner, a tackifier resin emulsion is obtained.

In the solvent emulsification method and the solventless emulsification method, a phase inversion emulsification method in which first, a water-in-oil emulsion is prepared to be then subjected to phase inversion into an oil-in-water emulsion can be also used.

The average particle size of the tackifier resin emulsion is, in view of retention of the appropriate viscosity, for example, 0.10 μm or more, preferably 0.20 μm or more, and in view of improvement of the storage stability and the mechanical stability, for example, 0.50 μm or less, preferably 0.40 μm or less.

The tackifier resin emulsion thus obtained contains the tackifier resin that is the reaction product of the above-described specific components, so that excellent pressure-sensitive adhesive force and excellent curved surface adhesiveness can be imparted to the pressure-sensitive adhesive composition. When the tackifier resin emulsion is used, an aqueous pressure-sensitive adhesive composition is obtained as the pressure-sensitive adhesive composition.

Thus, the tackifier resin (including the tackifier resin in the tackifier resin emulsion (hereinafter, the same)) is preferably used in the production of the pressure-sensitive adhesive composition.

The pressure-sensitive adhesive composition contains a tackifier resin and a (meth)acrylic resin.

The (meth)acrylic resin is a base polymer of the pressure-sensitive adhesive composition, and a known (meth)acrylic resin can be used. To be specific, the (meth)acrylic resin is obtained as a polymer of a material monomer mainly composed of the (meth)acrylate.

Examples of the (meth)acrylate include methyl (meth)acrylate, ethyl (meth)acrylate, butyl (meth)acrylate, hexyl (meth)acrylate, octyl (meth)acrylate, 2-ethylhexyl (meth)acrylate, glycidyl (meth)acrylate, and 2-hydroxyethyl (meth)acrylate. These (meth)acrylates can be used alone or in combination of two or more.

To improve the storage stability or the like, a (meth)acrylic acid copolylmerizable with the (meth)acrylate can be contained in the material monomer. Also, for example, another monomer copolymerizable with the (meth)acrylate such as vinyl acetate and styrene can be contained as needed. The polymerization method of the material monomer is not particularly limited, and a known method can be used.

When the tackifier resin emulsion is used as the tackifier resin, preferably, a (meth)acrylic resin emulsion is used as the (meth)acrylic resin.

The (meth)acrylic resin emulsion can be, for example, obtained by synthesizing the (meth)acrylic resin under the presence of a surfactant and water. As the surfactant, the above-described emulsifier is used, and these surfactants can be used alone or in combination of two or more. Preferably, an anionic emulsifier and a nonionic emulsifier are used. Preferably, the same emulsifier as that used in the preparation of the tackifier resin emulsion is used.

In the pressure-sensitive adhesive composition, as the mass ratio of the tackifier resin (including the tackifier resin in the tackifier resin emulsion) to the (meth)acrylic resin (including the (meth)acrylic resin in the (meth)acrylic resin emulsion), the ratio of the tackifier resin with respect to 100 parts by mass of the total amount of the tackifier resin and the (meth)acrylic resin is, for example, 5 parts by mass or more, preferably 10 parts by mass or more, more preferably 15 parts by mass or more, and for example, 35 parts by mass or less, preferably 30 parts by mass or less, more preferably 25 parts by mass or less.

When the mass ratio of the tackifier resin to the (meth) acrylic resin is within the above-described range, the pressure-sensitive adhesive composition having excellent pressure-sensitive adhesive force and excellent curved surface adhesiveness can be obtained.

The pressure-sensitive adhesive composition can also contain a cross-linking agent as needed.

Examples of the cross-linking agent include known cross-linking agents such as isocyanate cross-linking agent, epoxy cross-linking agent, silicone cross-linking agent, oxazoline cross-linking agent, aziridine cross-linking agent, silane cross-linking agent, alkylether melamine cross-linking agent, metal chelate cross-linking agent, and peroxide.

These cross-linking agents can be used alone or in combination of two or more.

As the cross-linking agent, preferably, an isocyanate cross-linking agent is used.

The mixing ratio of the cross-linking agent with respect to 100 parts by mass of the (meth)acrylic resin is, for example, 0.05 parts by mass or more, preferably 0.1 parts by mass or more, and for example, 15 parts by mass or less, preferably 10 parts by mass or less.

Furthermore, the pressure-sensitive adhesive composition can also contain a known additive as needed.

Examples of the additive include fillers, thickeners, foaming agents, colorants (dyes, pigments, or the like), antioxidants, light resistance stabilizers, heat resistance stabilizers, flame retardants, protective colloids, and film-forming auxiliaries.

These additives can be used alone or in combination of two or more.

The added amount and the timing of the addition of the additive are not particularly limited, and appropriately set in accordance with its purpose and use.

The pressure-sensitive adhesive composition contains the above-described tackifier resin, so that it has excellent pressure-sensitive adhesive force and excellent curved surface adhesiveness.

Thus, the pressure-sensitive adhesive composition can be preferably used in various industrial fields as, for example, a pressure-sensitive adhesive sheet, a pressure-sensitive adhesive film, and a pressure-sensitive adhesive paper.

EXAMPLES

Next, the present invention is described based on Examples and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

The details of the measurement method used in Examples and Comparative Examples are described in the following.

<Measurement of Weight Average Molecular Weight (Mw) with Gel Permeation Chromatography>

A sample was dissolved in tetrahydrofuran to be measured with gel permeation chromatograph (GPC) equipped with a refractive index detector (RID) with the sample concentration as 5.0 g/L, thereby obtaining a molecular weight distribution of the sample.

Thereafter, the weight average molecular weight (Mw) of the sample was calculated from the obtained chromatogram (chart) with the standard polystyrene as a calibration curve. The measurement device and the measurement conditions are shown below.

Data processing apparatus: part number, "GPC-101" (manufactured by SHOWA DENKO K.K.)

Refractive index detector: RI detector built in part number, "GPC-101"

Column: two pieces of part number, "KF-803", "KF-802", and "KF-801" (manufactured by SHOWA DENKO K.K.)

Mobile phase: tetrahydrofuran

Column flow rate: 1.0 mL/min

Sample concentration: 5.0 g/L

Injection amount: 100 μL

Measurement temperature: 40° C.

Molecular weight marker: standard polystyrene (SHODEX STANDARD, reference material manufactured by SHOWA DENKO K.K.)

<Measurement of Acid Value (mgKOH/g)>

In conformity with JIS K 5902 (2006), after 0.5 to 0.7 g of the sample was weighed in a 100 ml meyer with a chemical balance, and shook well until being completely dissolved in a neutral solvent (toluene/methanol=2:1), about 5 drops of 1% phenolphthalein was added thereto to be titrated with N/5KOH, thereby obtaining an acid value.

The end point of the titration was defined as the point at which the measurement liquid became slightly red, and didn't disappear within 30 seconds.

<Tackifier Resin>

Example 1

A 1 L flask was charged with 760 g of China Gum Rosin (non-modified rosin) as the rosins (A) to be dissolved by heating, while 5 ml/min of nitrogen was poured thereto. Thereafter, when the temperature reached 205° C., 40 g of isobornyl acrylate as the ring structure-containing compound (B) was charged into a dropping funnel and dropped over 2 hours, while the melted China Gum Rosin was stirred. Thereafter, the resulting product was cooled until 150° C. or less, and as a reaction product, a ring structure-added rosin (isobornyl acrylate-added rosin) was obtained.

Next, after the obtained ring structure-added rosin was dissolved at 200° C., 114 g of pentaerythritol as the alcohol (C) was added thereto at 200° C., and the temperature thereof was increased until 270° C. over 8 to 10 hours, thereby being subjected to esterification reaction.

In this manner, a tackifier resin was obtained. The acid value of the tackifier resin was 16.7 mgKOH/g, and the weight average molecular weight thereof was 1369.

Example 2

A 1 L flask was charged with 760 g of China Gum Rosin (non-modified rosin) to be dissolved by heating, while 5 ml/min of nitrogen was poured thereto. Thereafter, when the temperature reached 195° C., 23 g of maleic anhydride was charged to further react, while the melted China Gum Rosin was stirred. When the cloudiness disappeared, the reaction was completed. In this manner, 783 g of acid-modified rosin was obtained. The obtained rosin was defined as the rosins (A).

Next, 38 g of borneol was added to 783 g of the obtained acid-modified rosin as the rosins (A) to continue the reaction, and the borneol and a carboxylic acid in the acid-modified rosin were subjected to esterification reaction. The reaction time was 2 to 6 hours. Thereafter, the resulting product was cooled until 150° C. or less, thereby obtaining a ring structure-added rosin (borneol-added acid-modified rosin) as a reaction product.

Next, after the obtained ring structure-added rosin was dissolved at 200° C., 114 g of pentaerythritol as the alcohol (C) was added thereto at 200° C., and the temperature thereof was increased until 270° C. over 8 to 10 hours, thereby being subjected to esterification reaction.

In this manner, a tackifier resin was obtained. The acid value of the tackifier resin was 16.4 mgKOH/g, and the weight average molecular weight thereof was 1410.

Examples 3 to 5, 7 to 8, and 10 to 14

A tackifier resin was obtained in the same manner as that of Example 1, except that the mixing formulation shown in Tables 1 and 2 was used. In Examples 10 to 13, the mixing ratio of the China Gum Rosin to the isobornyl acrylate was changed, and in Example 14, 9.1 g of PERBUTYL Z (polymerization initiator, t-butyl-peroxybenzoate, manufactured by NOF CORPORATION) was added along with the China Gum Rosin and the isobornyl acrylate. The acid value and the weight average molecular weight of the tackifier resin are shown in Tables 1 and 2.

Examples 6 and 9

A tackifier resin was obtained in the same manner as that of Example 2, except that the mixing formulation shown in Table 1 was used. The acid value and the weight average molecular weight of the tackifier resin are shown in Table 1.

Comparative Example 1

A 2 L four-neck flask was charged with 1000 g of China Gum Rosin, and 760 g of mineral spirit was added thereto to be dissolved by heating, while 5 ml/min of nitrogen was poured thereto. Thereafter, when the resulting product was completely dissolved and capable of being stirred, it was cooled until 130° C., and 10 g of zinc chloride catalyst was added thereto to react at the same temperature for 4 hours. Thereafter, the obtained product was neutralized and washed for more than 3 times with 0.5% sodium bicarbonate water, thereby obtaining a crude polymerized rosin. Furthermore, the obtained crude polymerized rosin was distilled, and by removing a degradation product and a contained solvent, a polymerized rosin was obtained.

Next, after 500 g of the obtained polymerized rosin was dissolved at 200° C., 63 g of pentaerythritol as the alcohol (C) was added thereto at 200° C., and the temperature thereof was increased until 270° C. over 8 to 10 hours, thereby being subjected to esterification reaction. In this manner, a tackifier resin was obtained. The acid value of the tackifier resin was 15.1 mgKOH/g, and the weight average molecular weight thereof was 1450.

<Pressure-Sensitive Adhesive Composition>

Production Example 1 (Production of Base Polymer)

A flask equipped with a stirrer, a condenser, a thermometer, an inert gas introducing pipe, and a dropping funnel was charged with 600 parts of toluene as a solvent, and an inert gas (nitrogen gas) was introduced thereto to increase the temperature thereof at 85° C. Thereafter, a mixture was dropped from the funnel over 2 hours, while being stirred. The mixture consisted of 416 parts of n-butyl acrylate, 416 parts of 2-ethylhexyl acrylate, 15.3 parts of acrylic acid, 0.2 parts of 1.6-hexanediol diacrylate, 2.5 parts of 2-hydroxyethyl acrylate as a copolymerizable monomer, 32.0 parts of toluene, and 1 part of t-butylperoxy-2-ethyl hexanate (manufactured by NOF CORPORATION, trade name: PERBUTYL 0) as a polymerization initiator.

Thereafter, the temperature of the obtained mixture was increased to 95° C., and 30 minutes after the temperature reached 95° C., 2.53 parts of t-butylperoxy-2-ethyl hexanate as a polymerization initiator was added thereto. Furthermore, 2.53 parts thereof and 8.00 parts of toluene were added thereto 1 hour later to react for 1 hour. After the completion of the reaction, 216 parts of toluene was added thereto and stirred for 1 hour, thereby obtaining an acrylic resin having a weight average molecular weight of 400000 (using GPC manufactured by TOSOH CORPORATION) and a non-volatile component of 50 mass %.

Example 15

To 90 parts by mass (solid content) of the acrylic resin obtained in Production Example 1, 10 parts by mass (solid content) of the tackifier resin obtained in Example 1 was added. Furthermore, as a cross-linking agent, 1.55 parts by mass (solid content) of Coronate L-45E (isocyanate cross-linking agent, manufactured by Nippon Polyurethane Industry Co., Ltd., ethyl acetate solution with a concentration of 45% tolylene diisocyanate) with respect to 100 parts by mass of the total amount of the acrylic resin and the tackifier resin was added to be mixed and stirred, thereby preparing a pressure-sensitive adhesive composition.

Examples 16 to 37 and Comparative Examples 2 to 4

A pressure-sensitive adhesive composition was prepared in the same manner as that of Example 15, except that the mixing formulation shown in Tables 3 and 4 was used.

In Examples 15 to 28 and Comparative Example 3, 10 parts by mass of the tackifier resin with respect to 90 parts by mass of the acrylic resin was used.

In Examples 29 to 37 and Comparative Example 4, 20 parts by mass of the tackifier resin with respect to 80 parts by mass of the acrylic resin was used.

In Comparative Example 2, the tackifier resin was not added, and the acrylic resin only was used.

<Evaluation>

(1) Pressure-Sensitive Adhesive Force·Holding Force

The pressure-sensitive adhesive composition was applied to a polyethylene terephthalate film: PET film (manufactured by TORAY INDUSTRIES, INC., trade name: Lumirror T-60) having a thickness of 25 μm as a substrate so that the film thickness thereof after drying was 25 μm. Thereafter, after drying in the atmosphere at 100° C. for 5 minutes, the obtained laminate was covered with a PET film (manufactured by PANAC Corporation, trade name: SPPET7501BU) having its surface subjected to release treatment and having a thickness of 75 μm to be aged at 40° C. for 3 days, thereby obtaining an evaluation sheet.

Thereafter, the evaluation sheet was peeled from the PET film, and the pressure-sensitive adhesive force and the holding force thereof were evaluated in conformity with JIS Z 0237 (2009). The pressure-sensitive adhesive force was measured at 23° C., and the holding force was measured at 40° C.

The results are shown in Tables 3 and 4.

(2) Repulsion Resistance (Curved Surface Adhesiveness)

The pressure-sensitive adhesive composition was applied to both surfaces of the front surface and the rear surface of a polyethylene terephthalate film (heavy release PET film (trade name: SPPET5003BU, manufactured by PANAC Corporation)) having a thickness of 50 μm as a substrate so that the film thickness thereof after drying was 25 μm. Thereafter, after drying in the atmosphere at 100° C. for 5 minutes, the applied surfaces (both surfaces) of the obtained laminate were covered with a PET film (trade name: SPPET7501BU, manufactured by PANAC Corporation) having its surface subjected to release treatment and having a thickness of 75 μm to be aged at 40° C. for 3 days, thereby obtaining an evaluation sheet.

Thereafter, the obtained double-sided pressure-sensitive adhesive layer sheet was cut into a piece having a width of 25 mm and a length of 120 mm, and the PET film on one side thereof was peeled to be attached to a clean aluminum plate having a width of 48 mm, a length of 120 mm, and a thickness of 0.5 mm. Also, the PET film on the other side thereof was peeled to be attached to a clean ABS (acrylonitrile, butadiene-styrene copolymer resin) plate having a width of 48 mm, a length of 125 mm, and a thickness of 2.0 mm. Thereafter, a 2 kg roller was reciprocated once on the sample that was attached to each other at a speed of 300 mm per minute thereby being compressively bonded.

After an elapse of 30 minutes, the sample was fixed to a measurement jig having a length of 122 mm, and after an elapse of 6 hours at a normal temperature (25° C.), a distance (mm) of both ends of the aluminum plate being floated was measured.

The results are shown in Tables 3 and 4.

TABLE 1

| | | | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|
| Mixing Formulation (parts by mass) | Ring Structure-Added Rosins | Ring Structure-Containing Compound (B) | Compound Containing Two or More Alicyclic Rings | Isobornyl Acrylate | 40 | — | — | — | — | — | — | — | — |
| | | | | Borneol | — | 38 | — | — | — | — | — | — | — |
| | | | | Dicyclopentanyl Acrylate | — | — | 40 | — | — | — | — | — | — |
| | | | | Adamantyl Acrylate | — | — | — | 40 | — | — | — | — | — |
| | | | Compound Containing Aromatic Ring | Benzyl Acrylate | — | — | — | — | 40 | — | — | — | — |
| | | | | Benzyl Alcohol | — | — | — | — | — | 38 | — | — | — |
| | | | | Phenoxyethyl Acrylate | — | — | — | — | — | — | 40 | — | — |
| | | | Compound Containing One Alicyclic Ring | Cyclohexyl Acrylate | — | — | — | — | — | — | — | 40 | — |
| | | | | Cyclohexanol | — | — | — | — | — | — | — | — | 38 |
| | | Rosins (A) | | Rosin | 760 | — | 760 | 760 | 760 | — | 760 | 760 | — |
| | | | | Maleated Rosin | — | 783 | — | — | — | 783 | — | — | 783 |
| | | | | Polymerized Rosin | — | — | — | — | — | — | — | — | — |
| | Alcohol (C) | | | Pentaerythritol | 114 | 114 | 114 | 114 | 114 | 114 | 114 | 114 | 114 |
| | 100 × (B)/(A) | | | | 5 | 5 | 5 | 5 | 5 | 5 | 5 | 5 | 5 |
| Properties | Acid Value (mgKOH/g) | | | | 16.7 | 16.4 | 18.9 | 18.7 | 17.3 | 17.6 | 17.8 | 17.5 | 18.0 |
| | Weight Average Molecular Weight | | | | 1369 | 1410 | 1368 | 1371 | 1359 | 1400 | 1365 | 1358 | 1398 |

TABLE 2

| | | | | | Ex. 10 | Ex. 11 | Ex. 12 | Ex. 13 | Ex. 14 | Comp. Ex. 1 |
|---|---|---|---|---|---|---|---|---|---|---|
| Mixing Formulation (parts by mass) | Ring Structure-Added Rosins | Ring Structure-Containing Compound (B) | Compound Containing Two or More Alicyclic Rings | Isobornyl Acrylate | 3.6 | 1.8 | 132 | 157 | 40 | — |
| | | | | Borneol | — | — | — | — | — | — |
| | | | | Dicyclopentanyl Acrylate | — | — | — | — | — | — |
| | | | | Adamantyl Acrylate | — | — | — | — | — | — |
| | | | Compound Containing Aromatic Ring | Benzyl Acrylate | — | — | — | — | — | — |
| | | | | Benzyl Alcohol | — | — | — | — | — | — |
| | | | | Phenoxyethyl Acrylate | — | — | — | — | — | — |
| | | | Compound | Cyclohexyl Acrylate | — | — | — | — | — | — |

TABLE 2-continued

|  |  |  | Ex. 10 | Ex. 11 | Ex. 12 | Ex. 13 | Ex. 14 | Comp. Ex. 1 |
|---|---|---|---|---|---|---|---|---|
|  | Containing One Alicyclic Ring | Cyclohexanol | — | — | — | — | — | — |
|  | Rosins (A) | Rosin | 797 | 799 | 660 | 633 | 760 | — |
|  |  | Maleated Rosin | — | — | — | — | — | — |
|  |  | Polymerized Rosin | — | — | — | — | — | 500 |
|  | Polymerization Initiator |  | — | — | — | — | 9.1 | — |
|  | Alcohol (C) | Pentaerythritol | 114 | 114 | 121 | 123 | 114 | 63 |
|  | 100 × (B)/(A) |  | 0.5 | 0.2 | 20 | 25 | 5 | — |
| Properties | Acid Value (mgKOH/g) |  | 16.1 | 15.7 | 15.9 | 17.5 | 15.5 | 15.1 |
|  | Weight Average Molecular Weight |  | 1391 | 1393 | 1312 | 1296 | 1150 | 1450 |

TABLE 3

|  |  | Ex. 15 | Ex. 16 | Ex. 17 | Ex. 18 | Ex. 19 | Ex. 20 | Ex. 21 | Ex. 22 | Ex. 23 | Comp. Ex. 2 | Comp. Ex. 3 |
|---|---|---|---|---|---|---|---|---|---|---|---|---|
|  | Type |  |  |  |  |  |  |  |  |  |  |  |
|  |  | Ex. 1 | Ex. 2 | Ex. 3 | Ex. 4 | Ex. 5 | Ex. 6 | Ex. 7 | Ex. 8 | Ex. 9 | — | Comp. Ex. 1 |
| Mixing Formulation (parts by mass) | Tackifier Resin | 10 | 10 | 10 | 10 | 10 | 10 | 10 | 10 | 10 | — | 10 |
|  | Meth(acrylic) Resin | 90 | 90 | 90 | 90 | 90 | 90 | 90 | 90 | 90 | 100 | 90 |
|  | Cross-Linking Agent | 1.55 | 1.55 | 1.55 | 1.55 | 1.55 | 1.55 | 1.55 | 1.55 | 1.55 | 1.55 | 1.55 |
| Evaluation | Pressure-Sensitive Adhesive Force (N/25 mm) | 7.4 | 7.3 | 6.7 | 6.8 | 8.8 | 8.6 | 7.8 | 6.5 | 6.7 | 3.6 | 5.7 |
|  | Holding Force (mm) | 0.01 | 0.00 | 0.00 | 0.00 | 0.01 | 0.01 | 0.01 | 0.01 | 0.00 | 0.00 | 0.00 |
|  | Curved Surface Resilience (mm) | 6.2 | 8.4 | 6.7 | 6.6 | 7.0 | 8.7 | 7.5 | 7.9 | 8.8 | 11.4 | 9.5 |

|  |  | Ex. 24 | Ex. 25 | Ex. 26 | Ex. 27 | Ex. 28 |
|---|---|---|---|---|---|---|
|  | Type |  |  |  |  |  |
|  |  | Ex. 10 | Ex. 11 | Ex. 12 | Ex. 13 | Ex. 14 |
| Mixing Formulation (parts by mass) | Tackifier Resin | 10 | 10 | 10 | 10 | 10 |
|  | Meth(acrylic) Resin | 90 | 90 | 90 | 90 | 90 |
|  | Cross-Linking Agent | 1.55 | 1.55 | 1.55 | 1.55 | 1.55 |
| Evaluation | Pressure-Sensitive Adhesive Force (N/25 mm) | 6.8 | 5.9 | 7.0 | 6.2 | 6.1 |
|  | Holding Force (mm) | 0.01 | 0.01 | 0.00 | 0.01 | 0.01 |
|  | Curved Surface Resilience (mm) | 7.2 | 8.8 | 6.4 | 7.0 | 8.8 |

TABLE 4

|  |  | Ex. 29 | Ex. 30 | Ex. 31 | Ex. 32 | Ex. 33 | Ex. 34 | Ex. 35 | Ex. 36 | Ex. 37 | Comp. Ex. 4 |
|---|---|---|---|---|---|---|---|---|---|---|---|
|  | Type |  |  |  |  |  |  |  |  |  |  |
|  |  | Ex. 1 | Ex. 2 | Ex. 3 | Ex. 4 | Ex. 5 | Ex. 6 | Ex. 7 | Ex. 8 | Ex. 9 | Comp. Ex. 1 |
| Mixing Formulation (parts by mass) | Tackifier Resin | 20 | 20 | 20 | 20 | 20 | 20 | 20 | 20 | 20 | 20 |
|  | Meth(acrylic) Resin | 80 | 80 | 80 | 80 | 80 | 80 | 80 | 80 | 80 | 80 |
|  | Cross-Linking Agent | 1.55 | 1.55 | 1.55 | 1.55 | 1.55 | 1.55 | 1.55 | 1.55 | 1.55 | 1.55 |

TABLE 4-continued

| | | No. | | | | | | | | | |
|---|---|---|---|---|---|---|---|---|---|---|---|
| | | Ex. 29 | Ex. 30 | Ex. 31 | Ex. 32 | Ex. 33 | Ex. 34 | Ex. 35 | Ex. 36 | Ex. 37 | Comp. Ex. 4 |
| | | | | | | Type | | | | | |
| | | Ex. 1 | Ex. 2 | Ex. 3 | Ex. 4 | Ex. 5 | Ex. 6 | Ex. 7 | Ex. 8 | Ex. 9 | Comp. Ex. 1 |
| Evaluation | Pressure-Sensitive Adhesive Force (N/25 mm) | 8.0 | 8.0 | 7.7 | 7.8 | 9.0 | 8.9 | 8.3 | 7.6 | 7.7 | 7.2 |
| | Holding Force (mm) | 0.00 | 0.00 | 0.00 | 0.00 | 0.00 | 0.01 | 0.00 | 0.01 | 0.00 | 0.00 |
| | Curved Surface Resilience (mm) | 0.0 | 6.3 | 2.8 | 2.6 | 3.9 | 6.6 | 5.5 | 6.0 | 6.9 | 7.5 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The tackifier resin and the pressure-sensitive adhesive composition of the present invention are used as a pressure-sensitive adhesive sheet, a pressure-sensitive adhesive film, a pressure-sensitive adhesive paper, or the like.

What is claimed is:
1. A tackifier resin being a reaction product of:
rosins (A),
ring structure-containing compound (B) capable of reacting with the rosins, and
an alcohol (C),
wherein the rosins (A) are a non-modified rosin, and
wherein the ring structure-containing compound (B) is a (meth)acrylate having a ring structure.
2. The tackifier resin according to claim 1, wherein the ring structure-containing compound (B) contains a compound having an alicyclic group containing two or more alicyclic rings and/or a compound having an aromatic group containing one or more aromatic rings.
3. The tackifier resin according to claim 1, wherein the ring structure-containing compound (B) contains a compound having an isobornyl group.
4. The tackifier resin according to claim 1, wherein the ring structure-containing compound (B) contains a compound having a benzyl group.
5. A pressure-sensitive adhesive composition comprising: the tackifier resin according to claim 1, and
a (meth)acrylic resin.

* * * * *